(12) United States Patent
Shangguan et al.

(10) Patent No.: US 7,684,689 B2
(45) Date of Patent: Mar. 23, 2010

(54) EXTERNAL ADJUSTMENT MECHANISM FOR A CAMERA LENS AND ELECTRONIC IMAGER

(75) Inventors: Dongkai Shangguan, San Jose, CA (US); Elaine B. Bogue, Dunstable, MA (US); Vidyadhar Sitaram Kale, Lake Oswego, OR (US); Samuel Waising Tam, Daly City, CA (US); Ray H. Morton, New Braunfels, TX (US)

(73) Assignee: Flextronics International USA, Inc., Milpitas, CA (US)

( * ) Notice: Subject to any disclaimer, the term of this patent is extended or adjusted under 35 U.S.C. 154(b) by 0 days.

(21) Appl. No.: 11/228,010

(22) Filed: Sep. 15, 2005

(65) Prior Publication Data

US 2007/0058964 A1    Mar. 15, 2007

(51) Int. Cl.
*G02B 7/04* (2006.01)
*H04N 5/225* (2006.01)

(52) U.S. Cl. ........................ 396/144; 348/340
(58) Field of Classification Search ................. 359/819, 359/823; 348/340, 373; 396/144, 146
See application file for complete search history.

(56) References Cited

U.S. PATENT DOCUMENTS

| | | | | |
|---|---|---|---|---|
| 3,696,725 A * | 10/1972 | Lange | ........................ | 359/823 |
| 5,054,886 A * | 10/1991 | Ozaki et al. | .................. | 359/823 |
| 5,218,484 A * | 6/1993 | Terai | ........................... | 359/823 |
| 5,825,559 A | 10/1998 | Johnson et al. | ............. | 359/819 |
| 5,831,777 A * | 11/1998 | Iwasa | ......................... | 359/826 |
| 6,351,288 B1 | 2/2002 | Johnson et al. | ............. | 348/373 |
| 6,359,740 B1 * | 3/2002 | Tsuchiya | ..................... | 359/819 |
| 6,426,839 B2 | 7/2002 | Dou et al. | .................... | 359/823 |
| 6,476,985 B2 | 11/2002 | Dou et al. | .................... | 359/823 |
| 6,590,720 B2 | 7/2003 | Oba | ............................ | 359/819 |

(Continued)

FOREIGN PATENT DOCUMENTS

JP    2001-292365    10/2001

(Continued)

OTHER PUBLICATIONS

CN Application No. 200680040738.4, Office Action dated Oct. 30, 2009 (English translation).

(Continued)

*Primary Examiner*—Rodney E Fuller
(74) *Attorney, Agent, or Firm*—Henneman & Associates, PLC; Larry E. Henneman, Jr.

(57) ABSTRACT

A digital camera module includes an image capture device, a lens unit, a housing for receiving the lens unit and positioning the lens unit with respect to the image capture device, and a focus mechanism disposed on the outside of the housing and operative to move the lens unit along an axis when the lens unit is rotated about the axis. In one embodiment, the focus mechanism includes a ramp formed on the housing and a complementary ramp formed on the lens unit. In another embodiment, the focus mechanism includes a thread set formed on the outside of the housing for engaging a complementary thread set on a sleeve of the lens unit. In still another embodiment, the focus mechanism includes an inclined groove and a groove follower. The external adjustment mechanism prevents the image capture device from being contaminated by particulates generated during focusing.

125 Claims, 7 Drawing Sheets

U.S. PATENT DOCUMENTS

| | | | |
|---|---|---|---|
| 6,654,187 B2 | 11/2003 | Ning | 359/823 |
| 6,771,439 B2 * | 8/2004 | Ting | 359/822 |
| 7,190,404 B2 * | 3/2007 | Shinomiya | 348/374 |
| 2003/0137595 A1 | 7/2003 | Takachi | 348/340 |
| 2005/0190283 A1 * | 9/2005 | Ish-Shalom et al. | 348/340 |
| 2007/0008631 A1 | 1/2007 | Webster et al. | 159/519 |
| 2007/0077051 A1 * | 4/2007 | Toor et al. | 396/144 |

FOREIGN PATENT DOCUMENTS

| | | |
|---|---|---|
| TW | I 221207 | 9/2004 |

OTHER PUBLICATIONS

TW Application No. 095130828, Office Action dated Dec. 31, 2009 (English translation).

* cited by examiner

200~# EXTERNAL ADJUSTMENT MECHANISM FOR A CAMERA LENS AND ELECTRONIC IMAGER

BACKGROUND OF THE INVENTION

1. Field of the Invention

The present invention relates generally to electronic devices, and more particularly to digital camera modules. Even more particularly, the present invention relates to a system for focusing a digital camera module that prevents debris and particulate matter produced by the focusing process from contaminating the sensor array of an image capture device.

2. Description of the Background Art

Digital camera modules are currently being incorporated into a variety of electronic devices. Such camera hosting devices include, but are not limited to, cellular telephones, personal data assistants (PDAs), and computers. The demand for digital camera modules continues to grow as the ability to incorporate the camera modules into host devices expands. Therefore, one design goal of digital camera modules is to make them as small as possible so that they will fit into an electronic device without substantially increasing the overall size of the device. Furthermore, it is also desirable to manufacture such digital camera modules as efficiently and robustly as possible. Means for achieving these design goals must, of course, preserve the quality of the image captured by the camera modules.

FIG. 1 illustrates the basic components of a prior art digital camera module 100. Digital camera module 100 includes a lens unit 102 with a lens 103 contained therein, a housing 104, a substrate 106, and an image capture device 108. Substrate 106 is typically a printed circuit board (PCB) including electrical circuitry and contacts (not shown) of camera module 100. Image capture device 108 is mounted on and electrically coupled to PCB 106, and housing 104 is mounted on substrate 106 over image capture device 108. Lens unit 102 adjustably mounts to housing 104, by engaging a thread set 110 on lens unit 102 with a complementary thread set 112 in housing 104, so that an image can be focused onto image capture device 108 by lens unit 102.

Focal adjustment of lens unit 102 is facilitated by thread sets 110 and 112. During a factory focus operation, for example, focusing equipment rotates lens unit 102 with respect to housing 104, which adjusts the distance between lens 103 and image capture devices 108. When the lens unit 102 is properly focused, lens unit 102 is fixed in position with respect to housing 104 with an adhesive, a thermal weld, or the like.

Although camera modules that are focused via thread sets provide for relatively accurate focal adjustments, they suffer from several disadvantages. For example, threads are relatively difficult and expensive to manufacture on small optical components. In addition, small fine threads make screwing the lens unit into the housing a delicate operation. Furthermore, sliding friction between threads 110 of lens unit 102 and threads 112 of housing 104 creates particulate debris, which contaminate image capture device 108 or other imaging components of camera module 100 (e.g., infra-red filters, protective covers, other lenses, etc.). Such particulate debris noticeably degrades the quality of the captured images. Because digital camera modules are not easily disassembled and cleaned, particulate matter inside the module is particularly undesirable. It should also be noted that although threaded components are used here as an example, other types of focusing components located inside housing 104 can similarly produce particulate debris that reduces the quality of the captured images.

In efforts to minimize the costly process of manufacturing threaded camera modules, alternate focus features have been developed. For example, U.S. Pat. No. 6,426,839 issued to Dou et al. discloses a camera module including a plurality of ramps formed directly on a stationary lens located inside the camera module. A rotatable lens carrier (having a separate lens) includes a plurality of legs that engage the ramped surfaces of the stationary lens. Rotating the lens carrier causes the legs of the lens carrier to move up or down the ramped surfaces of the lens, thereby moving the second lens closer to or further from the stationary lens, depending on the direction of rotation. Although U.S. Pat. No. 6,426,839 may help reduce manufacturing cost, the focusing means are still located inside the camera module. Because the legs of the lens carrier slide over the ramped surfaces of the stationary lens, particulate debris can still be produced and collect on the imaging components of the camera module.

What is needed, therefore, is a camera module that can be manufactured inexpensively. What is also needed is a camera module that is easy to assemble. What is also needed is a camera module that minimizes contamination of the optical components during assembly and focusing.

SUMMARY

The present invention overcomes the problems associated with the prior art by providing a digital camera module that includes a focus mechanism disposed on the outside of the camera module. The invention enables a digital camera module to be focused without creating particulate debris within the camera module. Further, the invention enables a digital camera module to be manufactured and assembled more efficiently in terms of time, cost, quality and yield.

One digital camera module of the present invention includes an image capture device having a flat top surface, a lens unit, and a housing fixed with respect to the image capture device. The housing defines an opening to receive the lens unit and to position the lens unit with respect to the image capture device. A focus mechanism is disposed outside of the opening in the housing and is operative to move the lens unit along an axis substantially perpendicular to the flat top surface of the image capture device when the lens unit is rotated about the axis. In an example shown, the housing defines a base, surrounding the image capture device, and a cylindrical wall extending upwardly from the base. The opening is defined by the cylindrical wall.

In a particular embodiment, the focus mechanism includes at least one ramp disposed on one of the housing and the lens unit, and a ramp engaging structure (e.g., a complementary ramp, leg, post, etc.) disposed on the other of the housing and the lens unit. As one example, the housing defines at least three ramps and the lens unit defines at least three complementary ramps. Optionally, the ramps can be disposed on the top of the cylindrical wall or on the outer surface of the cylindrical wall.

In an alternate embodiment, one of the cylindrical wall and the lens unit defines a channel and the other of the cylindrical wall and the lens unit defines a guide member engaging the channel. Optionally, the channel and guide member may be formed in the ramped surfaces of the cylindrical wall and the lens unit. The guide member engages the channel to ensure that the lens unit remains centered with respect to the cylindrical wall, thereby preventing contact between the lens unit and the inner surface of the cylindrical wall.

In another particular embodiment, the lens unit defines a flange that at least partially surrounds the opening in the cylindrical wall when the lens unit is positioned with respect to the image capture device. Optionally, the flange can extend downward to form a sleeve around the outer surface of the cylindrical wall so as to eliminate contact between the upper surface of the cylindrical wall and the lens unit. In such cases the sleeve includes a portion of the focus mechanism. Examples, of focus mechanisms that can be included on the sleeve include, but are not limited to, ramps, thread sets, grooves, guide pins, cam/followers, or any combination thereof. These mechanism provide a means for focusably mounting said lens unit to said housing at one or more points outside of the opening in the housing.

The camera modules of the present invention can be used in combination with various camera-hosting devices including, but not limited to, mobile telephones, hand-held electronic organizers, computers, wired or wireless cams, and other types of portable electronic devices.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a system and method for focusing a digital camera module that is inexpensive to produce and where the focusing mechanism is located outside of the housing that houses imaging components of the camera module, such that particulate debris is less likely to contaminate the imaging components and degrade the quality of the captured images. In the following description, numerous specific details are set forth (e.g., particular examples focus mechanisms, substrate type and attachment, etc.) in order to provide a thorough understanding of the invention. Those skilled in the art will recognize, however, that the invention may be practiced apart from these specific details. In other instances, details of well known camera module manufacturing practices (e.g., automated focus processes, materials selection, molding processes, etc.) and components (e.g., electronic circuitry, device interfaces, etc.) have been omitted, so as not to unnecessarily obscure the present invention.

Figure 1:
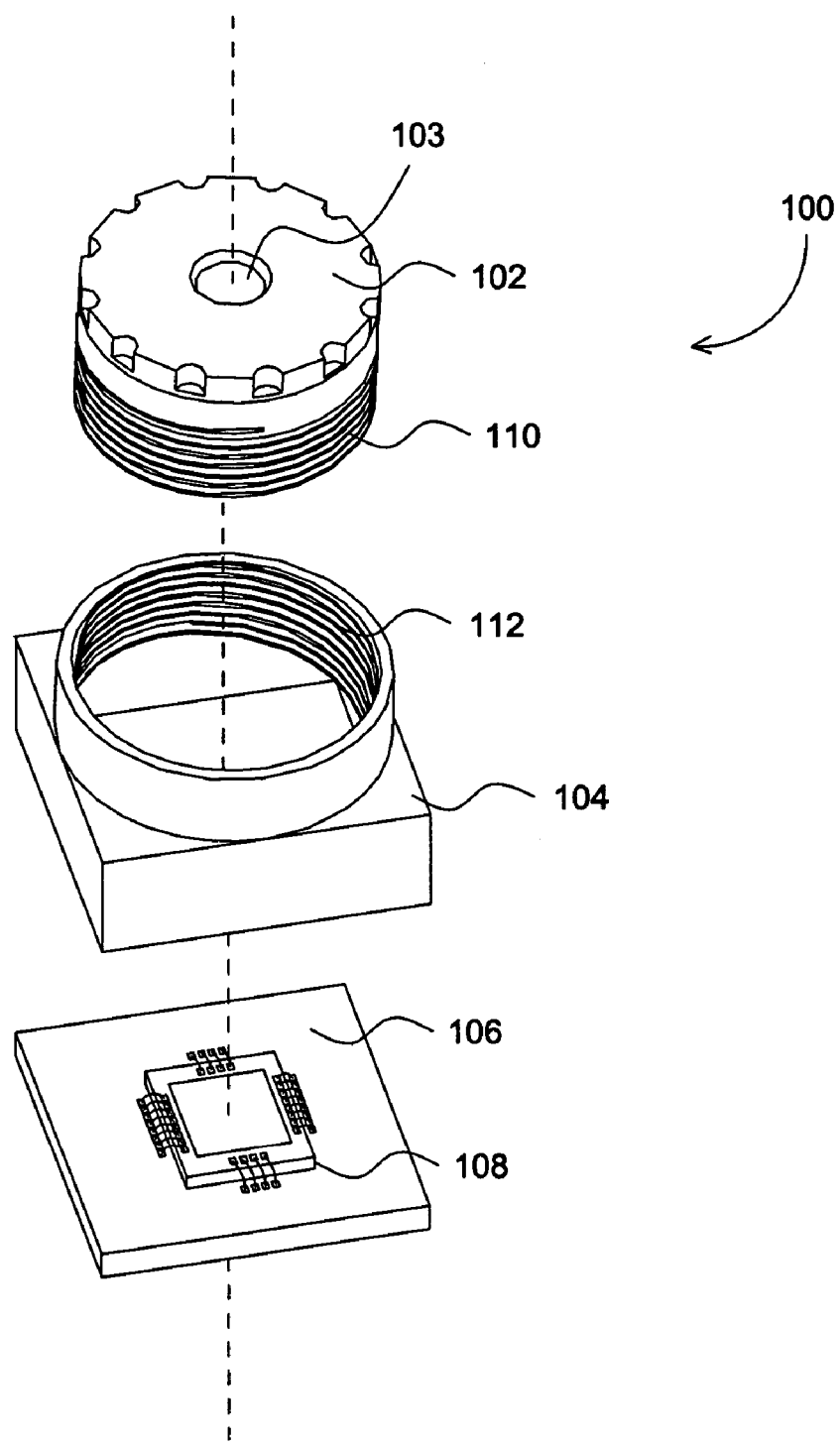
FIG. 1 is an exploded perspective view of a prior art camera module.
Figure 2:
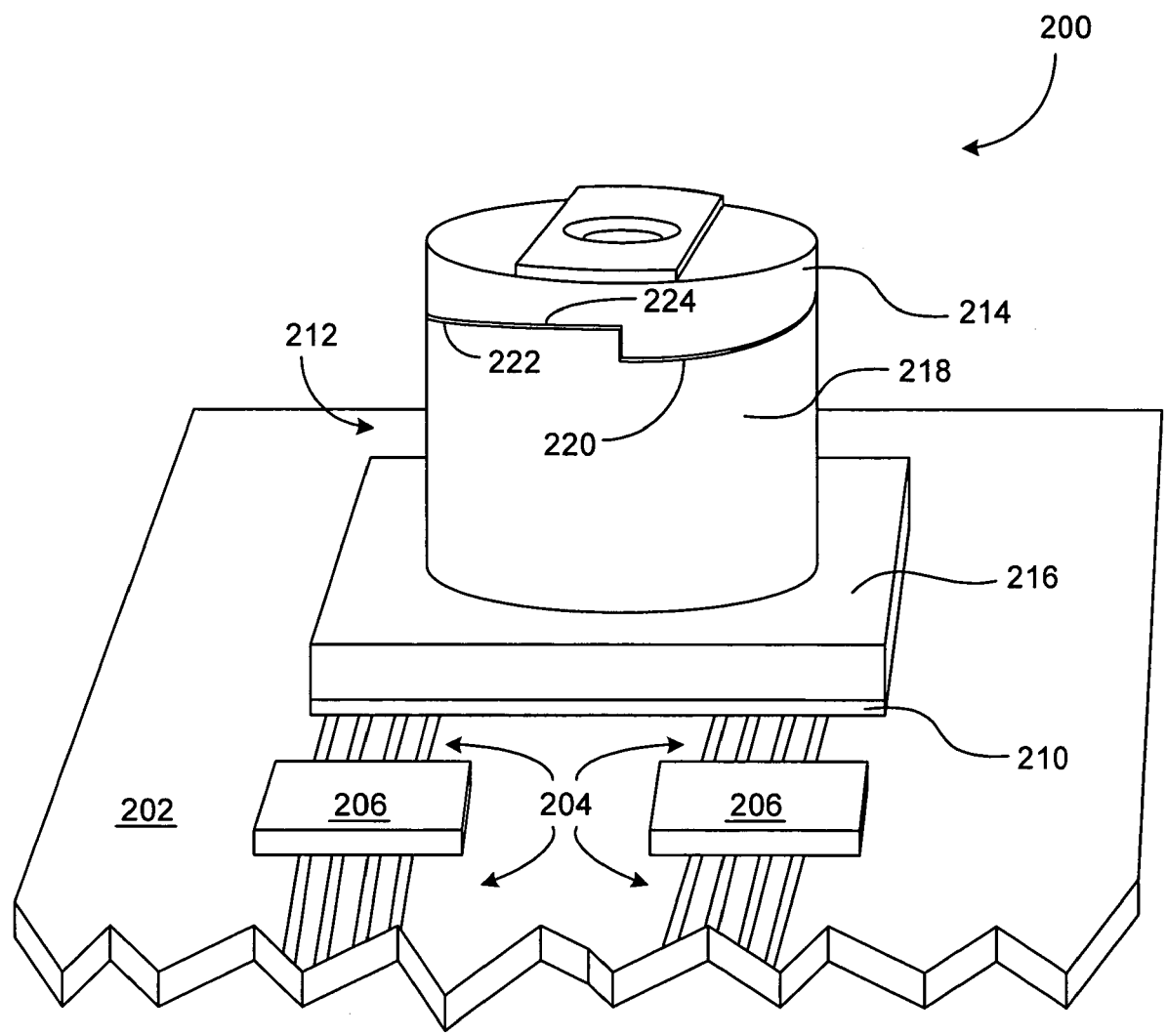
FIG. 2 is a perspective view of a camera module with external focus means according to one embodiment of the present invention.

FIG. 2 is a perspective view of a camera module 200 according to one embodiment of the present invention. Camera module 200 is shown mounted on a portion of printed circuit board (PCB) 202 that represents a PCB of a camera hosting device, and communicates electronically with other components of the hosting device via a plurality of electronic traces 204. Devices 206 represent electronic components (e.g., passive devices, etc.) that may be mounted directly on substrate 202. Those skilled in the art will recognize that the particular design of PCB 202 will depend on the particular application, and is not particularly relevant to the present invention. Therefore, substrate 202, traces 204, and devices 206 are representational in character only.

Camera module 200 includes an image capture device 208 (not visible in the view of FIG. 2), a circuit substrate 210, a housing 212, and a lens unit 214. Substrate 210 is mounted on PCB 202 via electrical contacts (not visible in FIG. 2) on the bottom of substrate 210. Image capture device 208 is mounted on substrate 210 under housing 212. Housing 212 includes a base 216 and a cylindrical wall 218. Base 216 is substantially the same shape as substrate 210 and, together with substrate 210, encloses image capture device 208 within camera module 200. Cylindrical wall 218 extends upwardly from base 216 and defines an opening for receiving and supporting lens unit 214.

Lens unit 214 is disposed within the top opening of cylindrical wall 218, and is adjustably mounted therein via an external focus mechanism 220. In this particular embodiment, focus mechanism 220 includes a plurality of inclined surfaces (ramps) 222 formed on cylindrical wall 218 and a plurality of complementary ramps 224 formed on lens unit 214.

Figure 3:
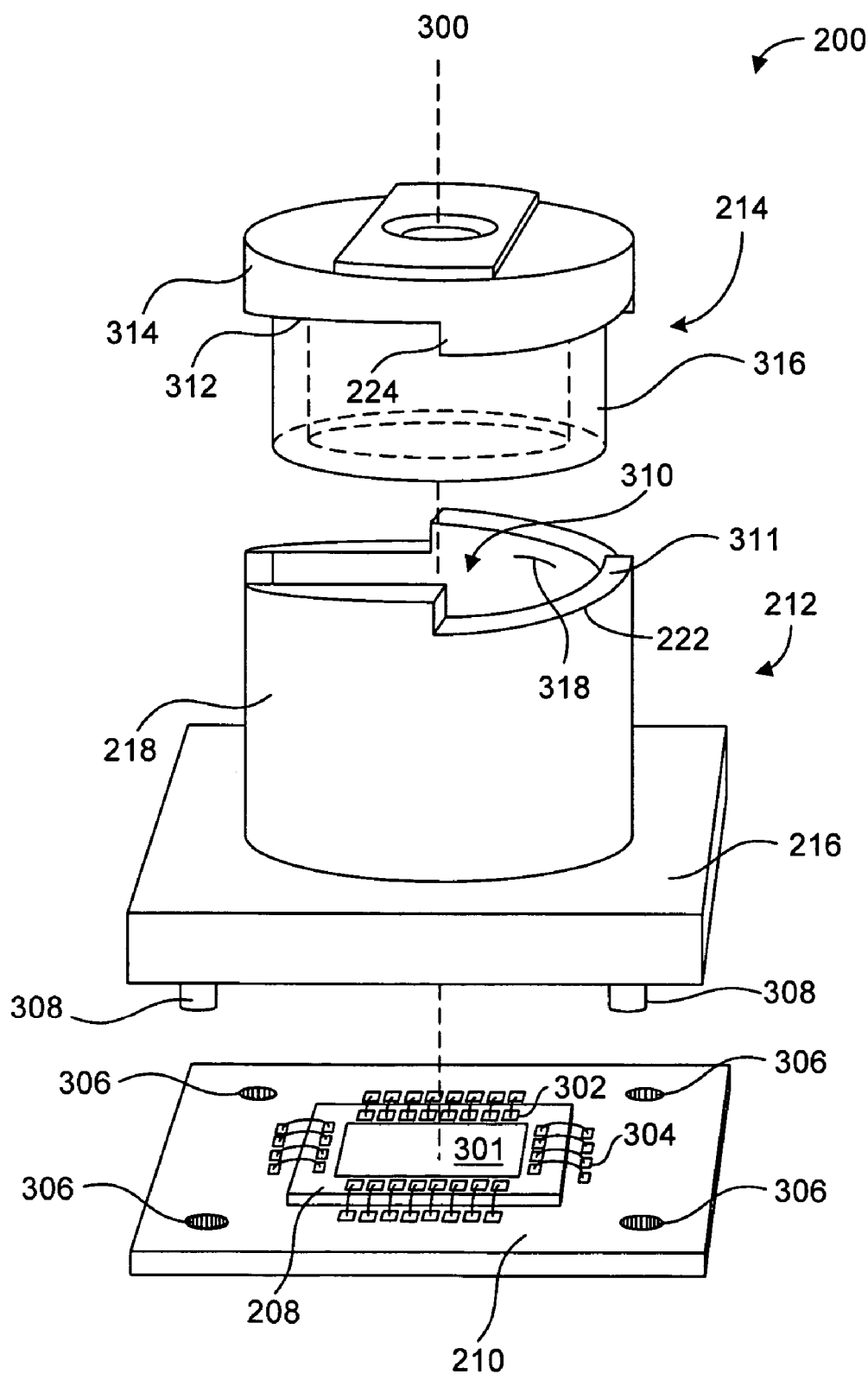
FIG. 3 is a partially exploded perspective view of the camera module of FIG. 2.

FIG. 3 is a partially exploded view of camera module 200, showing some additional details not visible in the view of FIG. 2. Note that the components of camera module 200 are aligned along an optical axis 300. In particular, lens unit 214 and cylindrical wall 218 of housing 212 are coaxial with respect to optical axis 300. Additionally, the imaging surface of image capture device 208 is substantially centered and substantially perpendicular with respect to optical axis 300. Proper optical alignment of lens unit 214 with image capture device 208 facilitates proper focus and lateral alignment of images captured by camera module 200.

Image capture device 208 includes a flat top surface 301, whereon images are focused and converted into electrical data that is processed by the processing circuitry of image capture device 208 and/or the host device. Image capture device 208 further comprises a plurality of die bond pads 302, each of which is electrically coupled to a respective one of a plurality of contact pads 304 on circuit substrate 210 via wire bonding. Die bond pads 302 and wire bonded contact pads 304 facilitate the electronic communication of image data between the imaging circuitry of image capture device 208 and the host device via PCB 202.

In the present embodiment, image capture device 208 is mounted directly onto circuit substrate 210 with a non-conductive adhesive (e.g., an epoxy). During mounting, image capture device 208 is positioned on circuit substrate 210 using high precision die attaching equipment, such that the optical center of imaging surface 301 is positioned on optical axis 300. Those skilled in the art will be familiar with such chip placement equipment. Further, using an adhesive to mount image capture device 208 to circuit substrate 210 maintains image capture device 208 in a planar relationship with respect to circuit substrate 210 to within +/−one-half degree so that surface 301 is substantially perpendicular to optical axis 300. Any variation in the thickness of the adhesive can be corrected via focal adjustment of lens unit 214. Alternatively, image capture device 208 can be mounted to substrate 210 via some other means including, but not limited to, flip-chip die bonding.

Housing 212 is mounted to substrate 210 so as to maintain proper alignment with optical axis 300. Circuit substrate 210 includes a plurality (four in this example) of apertures 306, which are located to properly align housing 212 with image capture device 208. Housing 212 includes a complementary plurality (only 2 of 4 visible in FIG. 3) of posts 308 disposed to engage apertures 306 of substrate 210. To secure housing 212 to circuit substrate 210, posts 308 are fixed within apertures 306 of circuit substrate 210 and are secured by any suitable means, such as by an adhesive, a thermal weld, etc. In order to facilitate surface mounting of camera module 200 on PCB 202 (FIG. 2), it is desirable that posts 308 do not extend beyond the bottom surface of circuit substrate 210. Alternatively, posts 308 can extend beyond the bottom surface of circuit substrate 210, and a like plurality of apertures 306 can be provided in PCB 202 for receiving posts 308 and aligning camera module 200 on PCB 202. As still another option, housing base 216 could be mounted directly onto circuit substrate 210 using an adhesive, and posts 308 and apertures could be eliminated. Generally, the mounting of housing 212 onto circuit substrate 210 will be accomplished with automated attaching machines.

FIG. 3 also shows external focus mechanism 220 that adjustably mounts lens unit 214 to housing 212 in greater detail. Cylindrical wall 218 defines a bore 310 for receiving lens unit 214 therein. Bore 310 extends from the open top of cylindrical wall through base 216 such that there is a clear optical path to image capture device 208. Ramps 222 are formed on an upper surface 311 of wall 218 outside the cylinder of bore 310. Complementary ramps 224 are formed on a lower surface 312 of a flange 314 extending radially from optical unit 214.

When complementary ramps 224 are engaged with ramps 222 of housing 212, ramps 222 and complementary ramps 224 form a focus mechanism facilitating adjustment of lens unit 214 along axis 300 by displacing lens unit 214 with respect to housing 212. In particular, rotating lens unit 214 in a counter-clockwise direction raises lens unit 214 with respect to housing 212, thereby increasing the distance between lens unit 214 and image capture device 208. Rotating lens unit 214 in a clockwise direction lowers lens unit 214 with respect to housing 212, thereby decreasing the distance between lens unit 214 and image capture device 208. Thus, an image focused by lens unit 214 can be properly adjusted to lie in the focal plane of image capture device 208. Further, because ramps 222 and complementary ramps 224 are located outside of the cylinder of bore 310, it is unlikely that any particulate debris caused by focusing lens unit 214 will fall into housing 212 and/or contaminate imaging surface 301 of image capture device 208.

Although the present embodiment shows four ramps 222 and four complementary ramps 224, it should be understood that the number of ramps 222 and 224 can be altered without departing from the scope of the present invention. For example, the inventors have found that using three ramps results in a good stable focus mechanism, and it is expected that using two ramps would result in an acceptable focus mechanism. Alternatively, the focus mechanism can include more than four ramps 224 and 226.

Lens unit 214 further includes a lens barrel 316 that carries a lens assembly (not shown) therein. The particular components of the lens assembly are not shown, because they are not particularly relevant to the present invention. Those skilled in the art will understand that known lens assemblies can include one or more lenses, an infrared filter, antireflective coatings, and so on. The particular components will depend on the particular camera type, quality, etc.

It is, however, an aspect of the present invention (although not an essential element) that lens unit 214 minimizes contact with the inner surface of 318 of cylindrical wall 218. The outer diameter of lens barrel 316 is slightly smaller than the diameter of bore 310 so as to enable lens barrel 316 to rotate within bore 310 without excessive rubbing against the inner surface 318 of cylindrical wall 218. Preventing contact between lens barrel 316 and inner surface 318 further reduces the chance of producing contaminating particulates inside housing 212 during the focusing process.

Figure 4:
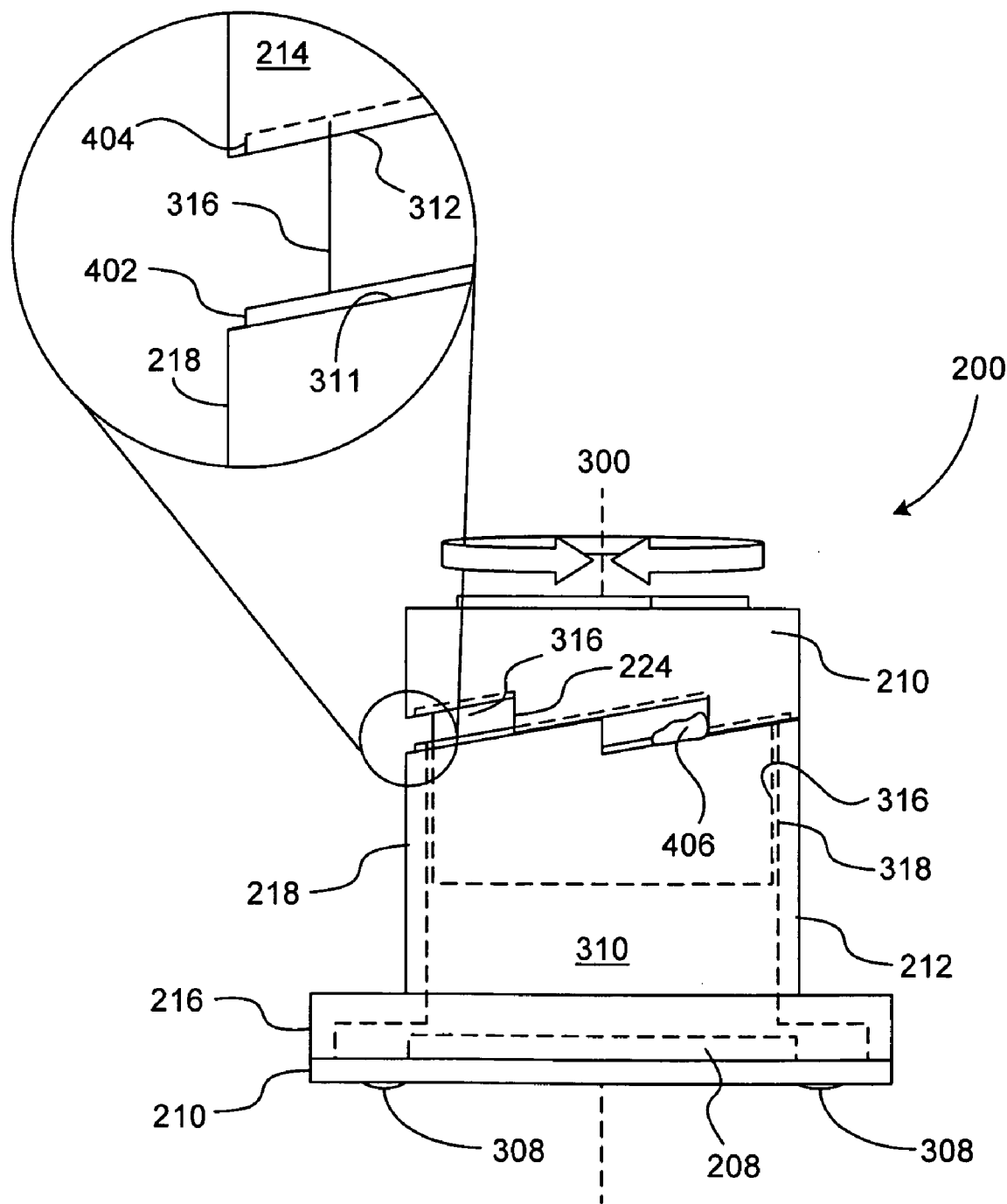
FIG. 4 is a side view showing portions of the camera module of FIG. 2 in greater detail.

FIG. 4 shows a side view of an assembled camera module 200 including an enlarged view of a portion of the centering mechanism that helps prevent contact between lens barrel 316 and inner surface 318 of cylindrical wall 218. In combination with the relative diameters of lens barrel 316 and bore 310, a centering mechanism prevents the undesirable contact. In this particular embodiment, upper surface 311 of cylindrical wall 218 defines a guide member 402 (a ridge in this example) that engages a complementary channel 404 formed in lower surface 312 of lens unit 210. Guide member 402 and channel 404 guide lens unit 214 as it is rotated and eliminate any horizontal movement between lens barrel 316 and inner surface 318 of cylindrical wall 218. Note that guide member 402 engages channel 404 outside the cylinder of bore 310, further reducing the probability that any generated particulate matter will fall into bore 310.

During the focusing process, lens unit 214 is rotated about optical axis 300 (as indicated by the double-headed arrow) until it is in proper focus. Then, it is fixed into position with an adhesive 406 that is applied between upper surface 311 of cylindrical wall 218 and lower surface 312 of lens unit 214. It should be understood that lens unit 214 can be fixed in position with respect to housing 212 by any suitable alternative means (e.g., a thermal weld, fastener, etc.).

FIG. 4 also shows that bore 310 is formed all the way through both cylindrical wall 218 and base 216 of housing 212 to provide a clear optical path between lens unit 214 and image capture device 208. Base 216 is substantially hollow and extends out outwardly so as to be able to accommodate image capture devices of various sizes. Finally, when housing 212 is mounted to substrate 210, and lens unit 214 is fixed into housing 212, image capture device 208 is substantially enclosed within camera module 200.

Figure 5A:
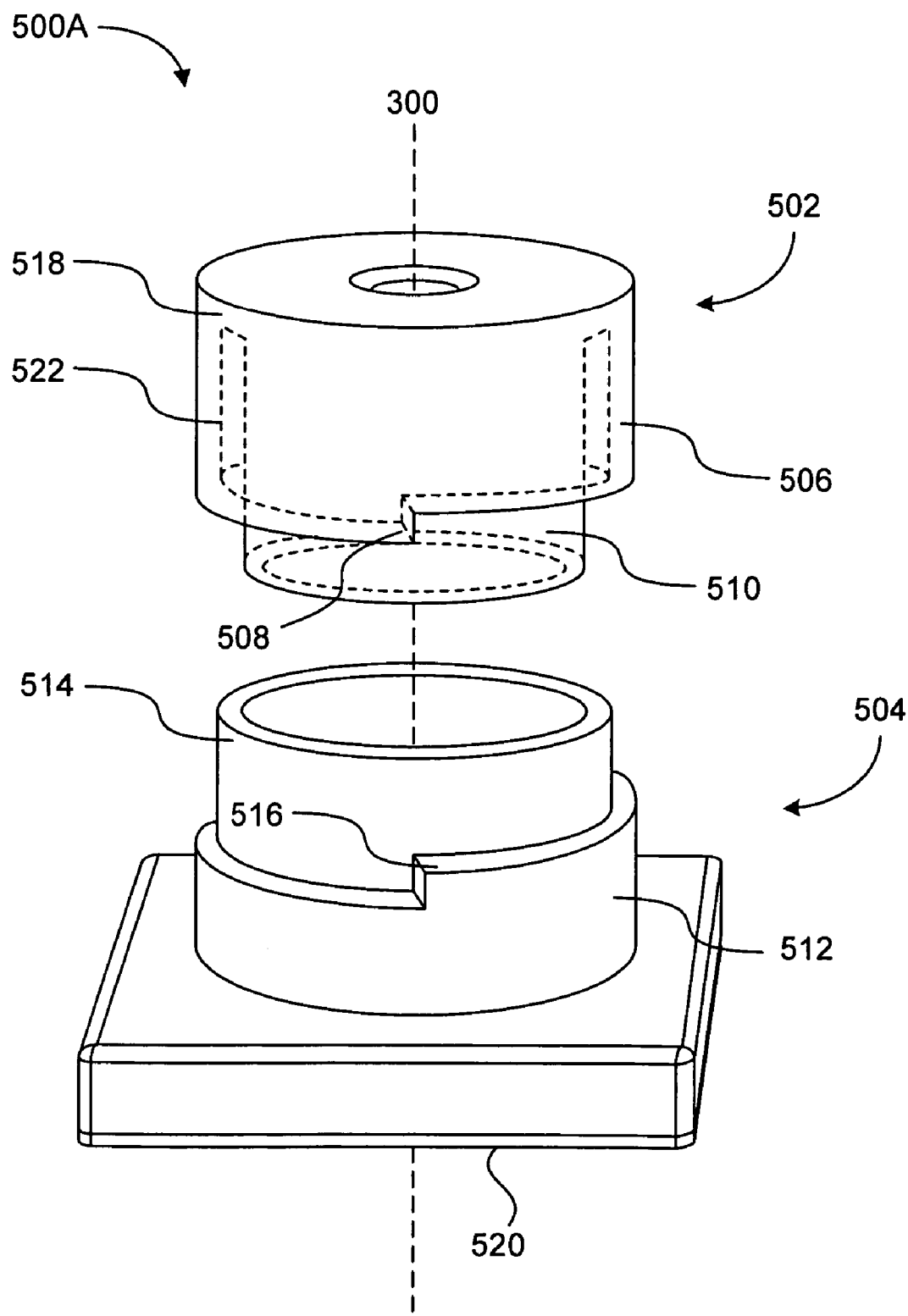
FIG. 5a is a partially exploded view of a camera module having external focusing means according to an alternate embodiment of the present invention.

FIG. 5A shows a partially exploded perspective view of a camera module 500A, which includes an alternate focus mechanism according to another aspect of the present invention. Camera module 500A includes an alternate lens unit 502, a housing 504, a circuit substrate 520, and an image capture device (not shown) mounted on substrate 520 and positioned within housing 504. Apart from the alternate focus mechanism described below, the components of camera module 500A are substantially similar to the respective components of camera module 200.

Lens unit 502 includes a flange 518 having a downwardly extending sleeve 506, which includes at least one ramp 508. Housing 504 includes a cylindrical wall with an inner portion 514 for receiving a lens barrel 510 of lens unit 502 therein, and an outer portion 512 having ramp(s) 516 that is/are complementary to ramp(s) 508 of lens unit 502. When camera module 500A is assembled, lens barrel 510 fits within cylindrical wall inner portion 514 and sleeve 506 slides over the outside of inner portion 514 such that ramp(s) 508 of lens unit 502 slidably engage complementary ramp(s) 516 of outer portion 512. When ramps 508 and complementary ramps 516 are engaged, rotating lens unit 502 about optical axis 300 causes lens unit 502 to move along optical axis 300 to facilitate focusing.

The structures of lens unit 502 and housing 504 further prevent particulate debris from falling into housing 504. For example, because ramps 508 and 516 are located outside of cylindrical wall 514 any particulate debris caused by friction between ramps 508 and 516 cannot fall into housing 504. Further, note that cylindrical wall inner portion 514 does not extend high enough to contact flange 518, thereby preventing any frictional contact between the top of inner portion 514 and flange 518. In addition, the outside surface of inner portion 514 abuts the inside surface of sleeve 506, together functioning as a centering mechanism to prevent frictional contact between inner portion 514 and lens barrel 510. These features substantially reduce the instances of particulate debris entering into housing 504.

As an alternative to sleeve 506 slidably abutting cylindrical wall inner portion 514, ramps 508 and 516 can include guide and channel structures, as discussed above with respect to FIG. 4. In addition, it should be understood that sleeve 506 need not be a solid barrel in order to function properly. For example, lens unit 502 can alternatively include a plurality of posts or other structures that extend downward from flange 518 so as to engage ramps 516.

Figure 5B:
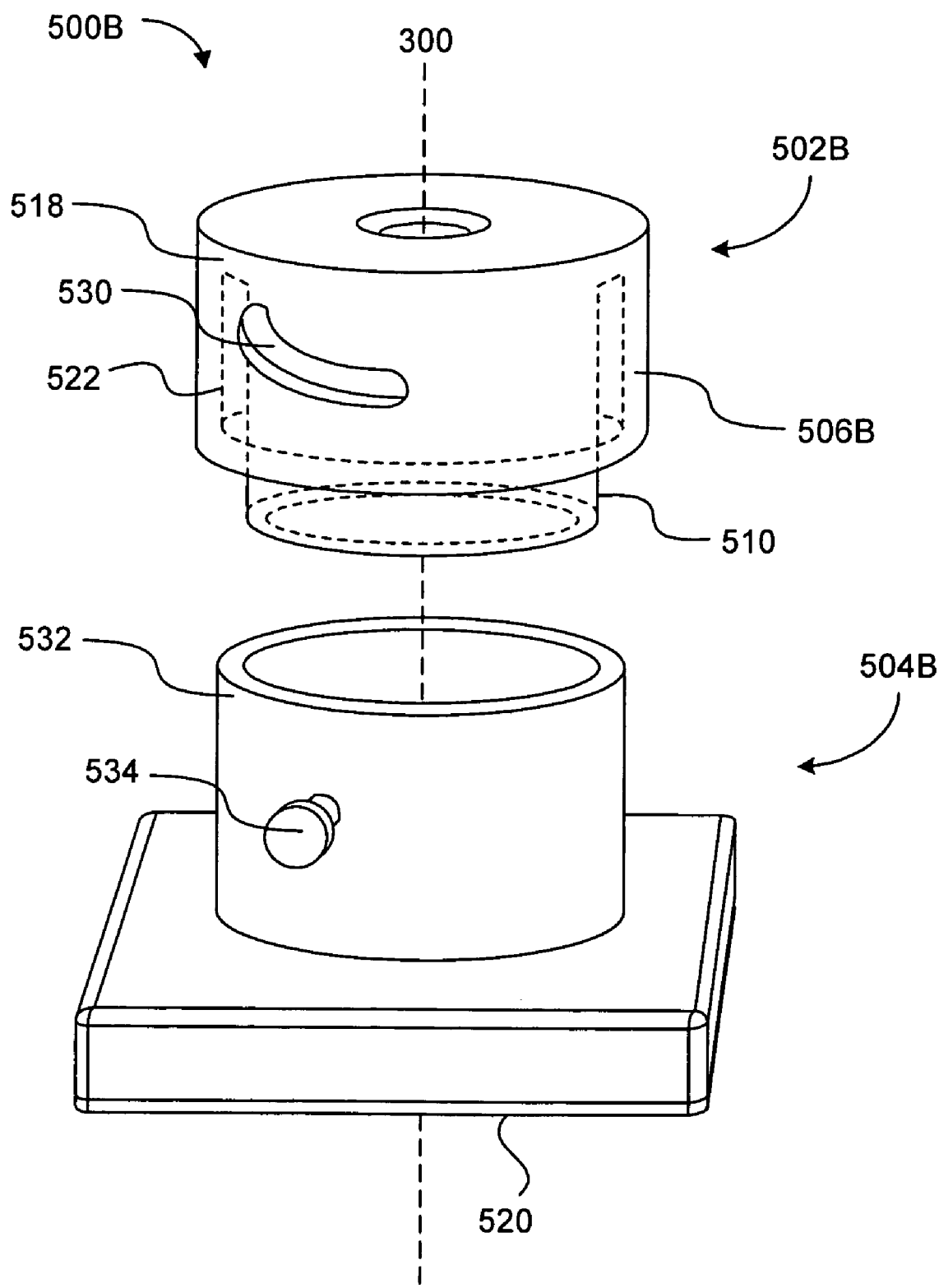
FIG. 5b is a partially exploded view of a camera module having external focusing means according to another alternate embodiment of the present invention.

FIG. 5B is a partially-exploded, perspective view of a camera module 500B, which includes another alternate focus mechanism according to another aspect of the present invention. Camera module 500B is similar to camera module 500A except that camera module 500B includes an alternate lens unit 502B and an alternate housing 504B, which are coupled via an alternate focus mechanism. In particular, lens unit 502B includes an inclined groove 530 formed through sleeve 506B. Housing 504B is similar to housing 504, except that housing 504B includes a single-thickness cylindrical wall 532 and a groove follower 534. In the present embodiment, groove follower 534 is a pin that passes through groove 530 and is fixed to cylindrical wall 532. When lens unit 502B is rotated about optical axis 300, lens unit 502B moves along axis 300, thereby facilitating the focusing of lens unit 502B with respect to the image capture device. Note that although only one groove 530 and pin 534 are visible in FIG. 5B, multiple iterations of groove 530 and pin 534 can be included in camera module 500B.

There are a variety of methods available for engaging groove follower 534 with groove 530. For example, groove follower 534 can be inserted through groove 530 and into cylindrical wall 532 after lens unit 502B is inserted in housing 504B. As another example, groove follower 534 can be permanently fixed to housing 504B, and groove 530 can extend to the bottom of sleeve 506B such that groove follower 534 can be inserted into groove 530. As still another example, groove 530 could be formed in the outer surface of (but not totally through) cylindrical wall 532 and groove follower 534 could be formed in sleeve 506B (e.g., a spring loaded pin, a bump on the inner surface 522 of sleeve 506, etc.). These and other variations will become apparent to those skilled in the art in view of this disclosure.

Finally, it should be noted that groove 530 and groove follower 534 are external to housing 504B, such that any debris created by frictional contact between groove 530 and groove follower 534 will not enter into housing 504B. In addition, the groove 530 and the groove follower 534 are more robust and less expensive to produce than the threaded prior art camera module 100.

Figure 5C:
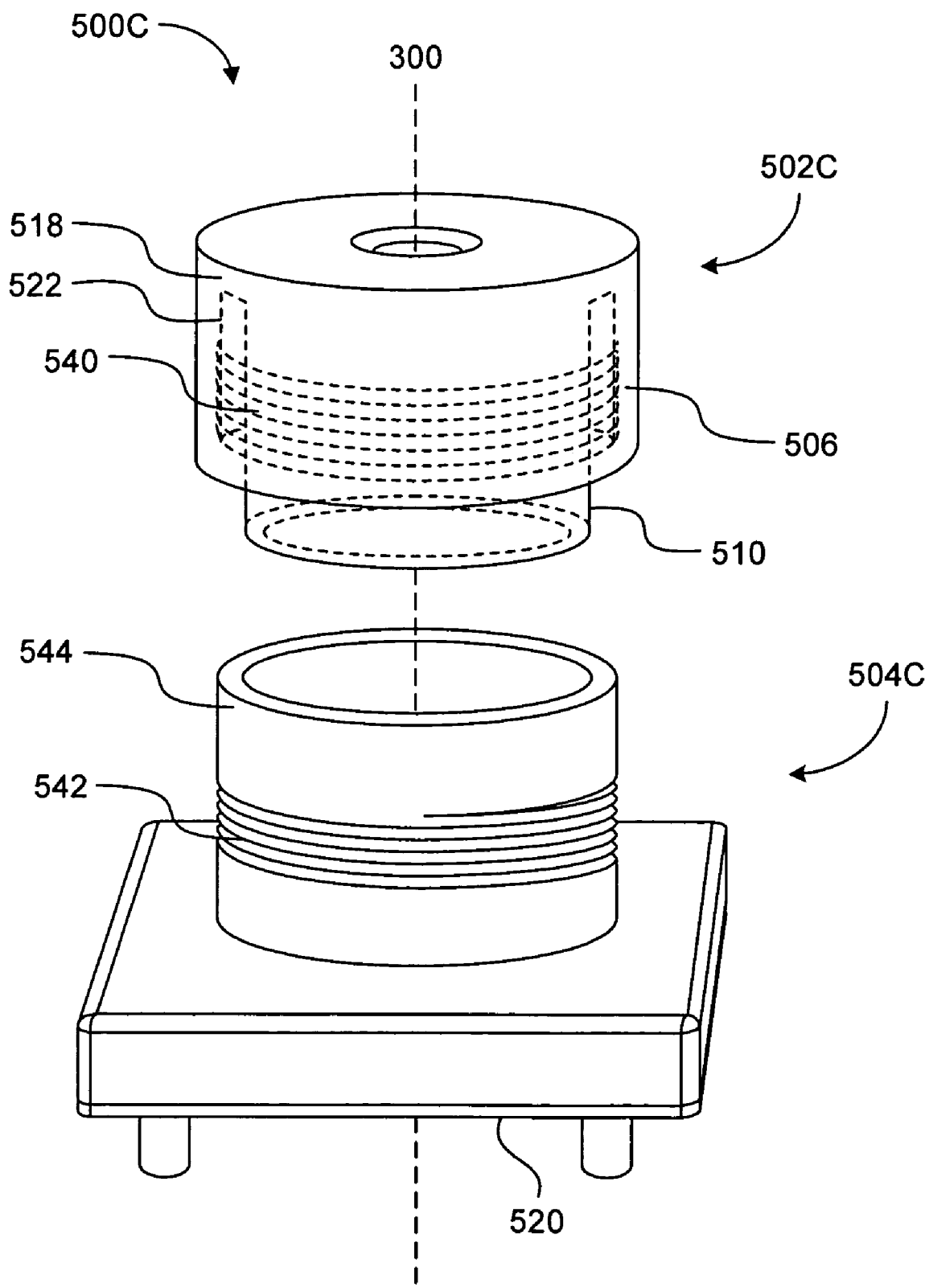
FIG. 5c is a partially exploded view of a camera module having external focusing means according to still another alternate embodiment of the present invention.

FIG. 5C shows a partially exploded perspective view of yet another alternate camera module 500C, which includes yet another alternate focus mechanism. Camera module 500C is similar to camera module 500B, except that groove 530 and pin 534 are replaced with a thread set 540 and a complementary thread set 542, respectively. In the alternate lens unit 502C, thread set 540 is formed on the inner surface 522 of sleeve 506. Complementary thread set 542 is formed on the outer surface of a cylindrical wall 544 of alternate housing 504C. When thread set 540 and complementary to thread set 542 are engaged, rotation of lens unit 502C with respect to housing 504C will cause lens unit 502C to move longitudinally along axis 300, thereby facilitating a focus operation.

As indicated above, the use of threads as a focus mechanism is considered to be less desirable from a manufacturing and assembly perspective. However, in some particular applications threads may provide a desired advantage (e.g., more precise focus, etc.). In applications where a threaded focus mechanism is desirable, the present invention still provides an advantage over the devices of the prior art. In particular, because thread set 540 and complementary thread set 542 are external to cylindrical wall 544, the image capture device will not be exposed to any debris created by frictional contact between thread sets 540 and 542 during the focus operation.

The description of particular embodiments of the present invention is now complete. Many of the described features may be substituted, altered or omitted without departing from the scope of the invention. For example, alternate external focus mechanisms may be substituted for those described above. As another example, alternate methods for mounting the circuit substrate to the module housing may be substituted for the mounting posts described. As yet another example, alternate types (e.g., socket, edge connector, etc.) and locations (e.g., side contacts, etc.) of electrical connections between circuit substrate 210 and PCB 202. These and other deviations from the particular embodiments shown will be apparent to those skilled in the art, particularly in view of the foregoing disclosure.

We claim:

1. A camera module comprising:
   an image capture device including a flat top surface;
   a lens unit including a lens rigidly affixed to said lens unit;
   a housing fixed with respect to said image capture device and defining an opening to receive said lens unit, said housing positioning said lens unit with respect to said image capture device;
   a focus mechanism disposed outside of said opening and operative to move said lens unit along an axis substantially perpendicular to said flat top surface of said image capture device when said lens unit is rotated about said axis; and
   a substrate having said image capture device mounted thereon, said substrate including a plurality of apertures formed therein; and
   wherein said housing includes a plurality of posts such that said posts engage said apertures when said housing is fixed with respect to said image capture device.

2. A camera module according to claim 1, wherein said housing includes a base surrounding said image capture device.

3. A camera module according to claim 1, wherein said focus mechanism includes:
   a ramp disposed on one of said housing and said lens unit; and
   a ramp engaging structure disposed on the other of said housing and said lens unit.

4. A camera module according to claim 3, wherein said ramp engaging structure includes a second ramp that is complementary to said ramp.

5. A camera module according to claim 1, wherein said housing includes a cylindrical wall defining said opening.

6. A camera module according to claim 5, wherein said cylindrical wall includes a top surface that defines at least a portion of said focus mechanism.

7. A camera module according to claim 6, wherein:
said focus mechanism includes at least one ramp; and
said top surface of said cylindrical wall defines said at least one ramp.

8. A camera module according to claim 7, wherein:
said focus mechanism further includes at least one complementary ramp slidably engaging said at least one ramp; and
said lens unit includes said at least one complementary ramp.

9. A camera module according to claim 7, wherein said focus mechanism includes at least three ramps.

10. A camera module according to claim 5, wherein at least a portion of said focus mechanism is disposed on an outer surface of said cylindrical wall.

11. A camera module according to claim 10, wherein:
said focus mechanism includes at least one ramp; and
said outer surface of said cylindrical wall defines said at least one ramp.

12. A camera module according to claim 11, wherein:
said focus mechanism further includes at least one complementary ramp slidably engaging said at least one ramp; and
said lens unit includes said at least one complementary ramp.

13. A camera module according to claim 11, wherein said focus mechanism includes at least three ramps.

14. A camera module according to claim 5, wherein:
one of said cylindrical wall and said lens unit defines a channel; and
the other of said cylindrical wall and said lens unit defines a guide member engaging said channel, said guide member operative to prevent said lens unit from contacting an inner surface of said cylindrical wall.

15. A camera module according to claim 5, wherein said lens unit further includes a sleeve at least partially surrounding said cylindrical wall when said lens unit is positioned with respect to said image capture device.

16. A camera module according to claim 15, wherein said sleeve includes at least a portion of said focus mechanism.

17. A camera module according to claim 16, wherein said portion of said focus mechanism is a ramp operative to engage a complementary ramp located on the outside of said cylindrical wall.

18. A camera module according to claim 16, wherein said portion of said focus mechanism is a thread set operative to engage a complementary thread set located on the outside of said cylindrical wall.

19. A camera module according to claim 16, wherein said portion of said focus mechanism includes one of a groove and a groove follower operative to engage the other of said groove and said groove follower located on the outside of said cylindrical wall.

20. A camera module according to claim 1, wherein said focus mechanism includes:
a groove formed in one of said housing and said lens unit; and
a groove follower formed in the other of said housing and said lens unit, said groove receiving said groove follower when said lens unit is positioned with respect to said image capture device.

21. A camera module according to claim 1, wherein said focus mechanism includes:
a thread set formed on said housing outside of said opening; and
a complementary thread set formed on said lens unit for engaging said thread set of said housing.

22. A camera module according to claim 1, wherein:
said housing further includes a base surrounding said image capture device and a cylindrical wall defining said opening;
said cylindrical wall includes a top surface defining at least one ramp; and
said lens unit includes at least one complementary ramp for slidably engaging said at least one ramp defined by said top surface of said cylindrical wall.

23. A camera module according to claim 1, wherein:
said housing defines a cylindrical bore operative to receive said lens unit; and
the upper perimeter of said bore defines said opening.

24. A camera module according to claim 1, wherein said lens unit includes:
a lens barrel; and
said lens is rigidly mounted within said lens barrel.

25. A camera module according to claim 24, wherein said lens rotates with said lens unit and moves with said lens unit along said axis when said lens unit is rotated about said axis.

26. A lens assembly comprising:
a lens unit including a lens rigidly mounted in a first housing;
a second housing defining a receiving portion for accepting said lens unit; and
a focus mechanism for adjustably coupling said first housing and said second housing, said focus mechanism disposed on the outside of said second housing; and wherein
said second housing includes a cylindrical wall having an inner surface and an outer surface; and
said lens unit includes a cylindrical surface disposed to slidably abut said outer surface of said cylindrical wall to prevent contact between said lens unit and said inner surface of said cylindrical wall.

27. A lens assembly according to claim 26, wherein said focus mechanism includes:
a ramp disposed on one of said second housing and said lens unit; and
a ramp engaging structure disposed on the other of said second housing and said lens unit.

28. A lens assembly according to claim 26, wherein said cylindrical wall of said second housing defines said receiving portion.

29. A lens assembly according to claim 28, wherein at least a portion of said focus mechanism is disposed on an outer surface of said cylindrical wall.

30. A lens assembly according to claim 28, wherein said cylindrical surface at least partially surrounds said cylindrical wall when said lens unit is positioned with respect to said housing.

31. A lens assembly according to claim 30, wherein said cylindrical surface includes at least a portion of said focus mechanism.

32. A lens assembly according to claim 26, wherein said focus mechanism causes said lens and said lens unit to rotate together when said lens unit is adjusted with respect to said housing.

33. A camera module comprising:
an image capture device including a flat top surface;
a lens unit including a lens rigidly affixed to said lens unit;

a housing fixed with respect to said image capture device and defining an opening to receive said lens unit, said housing positioning said lens unit with respect to said image capture device; and a focus mechanism disposed outside of said opening and operative to move said lens unit along an axis substantially perpendicular to said flat top surface of said image capture device when said lens unit is rotated about said axis; and wherein said focus mechanism includes a ramp disposed on one of said housing and said lens unit and a ramp engaging structure disposed on the other of said housing and said lens unit; and said ramp engaging structure includes a second ramp that is complementary to said ramp.

34. A camera module according to claim 33, wherein said housing includes a base surrounding said image capture device.

35. A camera module according to claim 33, wherein said housing includes a cylindrical wall defining said opening.

36. A camera module according to claim 35, wherein said cylindrical wall includes a top surface that defines at least a portion of said focus mechanism.

37. A camera module according to claim 36, wherein said top surface of said cylindrical wall defines at least one of said ramp and said second ramp.

38. A camera module according to claim 37, wherein said lens unit includes said second ramp.

39. A camera module according to claim 37, wherein said focus mechanism includes at least three ramps.

40. A camera module according to claim 35, wherein at least a portion of said focus mechanism is disposed on an outer surface of said cylindrical wall.

41. A camera module according to claim 40, wherein said outer surface of said cylindrical wall defines one of said ramp and said second ramp.

42. A camera module according to claim 41, wherein said lens unit includes said second ramp.

43. A camera module according to claim 41, wherein said focus mechanism includes at least three ramps.

44. A camera module according to claim 35, wherein:
one of said cylindrical wall and said lens unit defines a channel; and
the other of said cylindrical wall and said lens unit defines a guide member engaging said channel, said guide member operative to prevent said lens unit from contacting an inner surface of said cylindrical wall.

45. A camera module according to claim 35, wherein said lens unit further includes a sleeve at least partially surrounding said cylindrical wall when said lens unit is positioned with respect to said image capture device.

46. A camera module according to claim 45, wherein said sleeve includes at least a portion of said focus mechanism.

47. A camera module according to claim 33, wherein:
said housing further includes a base surrounding said image capture device and a cylindrical wall defining said opening;
said cylindrical wall includes a top surface defining said ramp; and
said lens unit includes said second ramp for slidably engaging said ramp defined by said top surface of said cylindrical wall.

48. A camera module according to claim 33, wherein:
said housing defines a cylindrical bore operative to receive said lens unit; and
the upper perimeter of said bore defines said opening.

49. A camera module according to claim 33, wherein said lens unit includes:
a lens barrel; and
said lens is rigidly mounted within said lens barrel.

50. A camera module according to claim 49, wherein said lens rotates with said lens unit and moves with said lens unit along said axis when said lens unit is rotated about said axis.

51. A camera module comprising:
an image capture device including a flat top surface;
a lens unit including a lens rigidly affixed to said lens unit;
a housing fixed with respect to said image capture device and defining an opening to receive said lens unit, said housing positioning said lens unit with respect to said image capture device; and
a focus mechanism disposed outside of said opening and operative to move said lens unit along an axis substantially perpendicular to said flat top surface of said image capture device when said lens unit is rotated about said axis; and wherein
said housing includes a cylindrical wall defining said opening; and
said cylindrical wall includes a top surface that defines at least a portion of said focus mechanism.

52. A camera module according to claim 51, wherein:
said focus mechanism includes at least one ramp; and
said top surface of said cylindrical wall defines said at least one ramp.

53. A camera module according to claim 52, wherein:
said focus mechanism further includes at least one complementary ramp slidably engaging said at least one ramp; and
said lens unit includes said at least one complementary ramp.

54. A camera module according to claim 52, wherein said focus mechanism includes at least three ramps.

55. A camera module according to claim 51, wherein said housing includes a base surrounding said image capture device.

56. A camera module according to claim 51, wherein:
one of said cylindrical wall and said lens unit defines a channel; and
the other of said cylindrical wall and said lens unit defines a guide member engaging said channel, said guide member operative to prevent said lens unit from contacting an inner surface of said cylindrical wall.

57. A camera module according to claim 51, wherein:
said housing defines a cylindrical bore operative to receive said lens unit; and
the upper perimeter of said bore defines said opening.

58. A camera module according to claim 51, wherein said lens unit includes:
a lens barrel; and
said lens is rigidly mounted within said lens barrel.

59. A camera module according to claim 58, wherein said lens rotates with said lens unit and moves with said lens unit along said axis when said lens unit is rotated about said axis.

60. A camera module comprising:
an image capture device including a flat top surface;
a lens unit including a lens rigidly affixed to said lens unit;
a housing fixed with respect to said image capture device and defining an opening to receive said lens unit, said housing positioning said lens unit with respect to said image capture device; and
a focus mechanism disposed outside of said opening and operative to move said lens unit along an axis substantially perpendicular to said flat top surface of said image capture device when said lens unit is rotated about said axis; and wherein said housing includes a cylindrical wall defining said opening;

at least a portion of said focus mechanism is disposed on an outer surface of said cylindrical wall;

said focus mechanism includes at least one ramp;

said outer surface of said cylindrical wall defines said at least one ramp;

said focus mechanism further includes at least one complementary ramp slidably engaging said at least one ramp; and said lens unit includes said at least one complementary ramp.

61. A camera module according to claim 60, wherein said focus mechanism includes at least three ramps.

62. A camera module according to claim 60, wherein said housing includes a base surrounding said image capture device.

63. A camera module according to claim 60, wherein said lens unit further includes a sleeve at least partially surrounding said cylindrical wall when said lens unit is positioned with respect to said image capture device.

64. A camera module according to claim 63, wherein said sleeve includes said at least one complementary ramp.

65. A camera module according to claim 60, wherein:
said housing defines a cylindrical bore operative to receive said lens unit; and
the upper perimeter of said bore defines said opening.

66. A camera module according to claim 60, wherein said lens unit includes:
a lens barrel; and
said lens is rigidly mounted within said lens barrel.

67. A camera module according to claim 66, wherein said lens rotates with said lens unit and moves with said lens unit along said axis when said lens unit is rotated about said axis.

68. A camera module comprising:
an image capture device including a flat top surface;
a lens unit including a lens rigidly affixed to said lens unit;
a housing fixed with respect to said image capture device and defining an opening to receive said lens unit, said housing positioning said lens unit with respect to said image capture device; and
a focus mechanism disposed outside of said opening and operative to move said lens unit along an axis substantially perpendicular to said flat top surface of said image capture device when said lens unit is rotated about said axis; and wherein
said housing includes a cylindrical wall defining said opening;
one of said cylindrical wall and said lens unit defines a channel; and
the other of said cylindrical wall and said lens unit defines a guide member engaging said channel, said guide member operative to prevent said lens unit from contacting an inner surface of said cylindrical wall.

69. A camera module according to claim 68, wherein said housing includes a base surrounding said image capture device.

70. A camera module according to claim 68, wherein said focus mechanism includes:
a ramp disposed on one of said housing and said lens unit; and
a ramp engaging structure disposed on the other of said housing and said lens unit.

71. A camera module according to claim 68, wherein:
said cylindrical wall includes a top surface that defines at least a portion of said focus mechanism;
said focus mechanism includes at least one ramp; and
said top surface of said cylindrical wall defines said at least one ramp.

72. A camera module according to claim 71, wherein:
said focus mechanism further includes at least one complementary ramp slidably engaging said at least one ramp; and
said lens unit includes said at least one complementary ramp.

73. A camera module according to claim 71, wherein said focus mechanism includes at least three ramps.

74. A camera module according to claim 68, wherein at least a portion of said focus mechanism is disposed on an outer surface of said cylindrical wall.

75. A camera module according to claim 68, wherein:
said housing defines a cylindrical bore operative to receive said lens unit; and
the upper perimeter of said bore defines said opening.

76. A camera module according to claim 68, wherein said lens unit includes:
a lens barrel; and
said lens is rigidly mounted within said lens barrel.

77. A camera module according to claim 76, wherein said lens rotates with said lens unit and moves with said lens unit along said axis when said lens unit is rotated about said axis.

78. A camera module comprising:
an image capture device including a flat top surface;
a lens unit including a lens rigidly affixed to said lens unit;
a housing fixed with respect to said image capture device and defining an opening to receive said lens unit, said housing positioning said lens unit with respect to said image capture device; and
a focus mechanism disposed outside of said opening and operative to move said lens unit along an axis substantially perpendicular to said flat top surface of said image capture device when said lens unit is rotated about said axis; and wherein
said housing includes a cylindrical wall defining said opening; and
said lens unit further includes a sleeve at least partially surrounding said cylindrical wall when said lens unit is positioned with respect to said image capture device.

79. A camera module according to claim 78, wherein said sleeve includes at least a portion of said focus mechanism.

80. A camera module according to claim 79, wherein said portion of said focus mechanism is a ramp operative to engage a complementary ramp located on the outside of said cylindrical wall.

81. A camera module according to claim 79, wherein said portion of said focus mechanism is a thread set operative to engage a complementary thread set located on the outside of said cylindrical wall.

82. A camera module according to claim 79, wherein said portion of said focus mechanism includes one of a groove and a groove follower operative to engage the other of said groove and said groove follower located on the outside of said cylindrical wall.

83. A camera module according to claim 78, wherein said housing includes a base surrounding said image capture device.

84. A camera module according to claim 78, wherein said focus mechanism includes:
a ramp disposed on one of said housing and said lens unit; and a ramp engaging structure disposed on the other of said housing and said lens unit.

85. A camera module according to claim 78, wherein at least a portion of said focus mechanism is disposed on an outer surface of said cylindrical wall.

86. A camera module according to claim 85, wherein:
said focus mechanism includes at least one ramp; and
said outer surface of said cylindrical wall defines said at least one ramp.

87. A camera module according to claim 86, wherein said focus mechanism includes at least three ramps.

88. A camera module according to claim 78, wherein said focus mechanism includes:
a groove formed in one of said housing and said lens unit; and
a groove follower formed in the other of said housing and said lens unit, said groove receiving said groove follower when said lens unit is positioned with respect to said image capture device.

89. A camera module according to claim 78, wherein said focus mechanism includes:
a thread set formed on said housing outside of said opening; and
a complementary thread set formed on said lens unit for engaging said thread set of said housing.

90. A camera module according to claim 78, wherein:
said housing defines a cylindrical bore operative to receive said lens unit; and
the upper perimeter of said bore defines said opening.

91. A camera module according to claim 78, wherein said lens unit includes:
a lens barrel; and
said lens is rigidly mounted within said lens barrel.

92. A camera module according to claim 91, wherein said lens rotates with said lens unit and moves with said lens unit along said axis when said lens unit is rotated about said axis.

93. A camera module comprising:
an image capture device including a flat top surface;
a lens unit including a lens rigidly affixed to said lens unit;
a housing fixed with respect to said image capture device and defining an opening to receive said lens unit, said housing positioning said lens unit with respect to said image capture device; and
a focus mechanism disposed outside of said opening and operative to move said lens unit along an axis substantially perpendicular to said flat top surface of said image capture device when said lens unit is rotated about said axis; and wherein
said focus mechanism includes a groove formed in one of said housing and said lens unit and a groove follower formed in the other of said housing and said lens unit, said groove receiving said groove follower when said lens unit is positioned with respect to said image capture device.

94. A camera module according to claim 93, wherein said housing includes a base surrounding said image capture device.

95. A camera module according to claim 93, wherein said housing includes a cylindrical wall defining said opening.

96. A camera module according to claim 95, wherein at least a portion of said focus mechanism is disposed on an outer surface of said cylindrical wall.

97. A camera module according to claim 95, wherein:
said lens unit further includes a sleeve at least partially surrounding said cylindrical wall when said lens unit is positioned with respect to said image capture device; and
said sleeve includes at least a portion of said focus mechanism.

98. A camera module according to claim 93, wherein:
said housing defines a cylindrical bore operative to receive said lens unit; and
the upper perimeter of said bore defines said opening.

99. A camera module according to claim 93, wherein said lens unit includes:
a lens barrel; and
said lens is rigidly mounted within said lens barrel.

100. A camera module according to claim 99, wherein said lens rotates with said lens unit and moves with said lens unit along said axis when said lens unit is rotated about said axis.

101. A camera module comprising:
an image capture device including a flat top surface;
a lens unit including a lens rigidly affixed to said lens unit;
a housing fixed with respect to said image capture device and defining an opening to receive said lens unit, said housing positioning said lens unit with respect to said image capture device; and
a focus mechanism disposed outside of said opening and operative to move said lens unit along an axis substantially perpendicular to said flat top surface of said image capture device when said lens unit is rotated about said axis; and wherein
said focus mechanism includes a thread set formed on said housing outside of said opening and a complementary thread set formed on said lens unit for engaging said thread set of said housing.

102. A camera module according to claim 101, wherein said housing includes a base surrounding said image capture device.

103. A camera module according to claim 101, wherein said housing includes a cylindrical wall defining said opening.

104. A camera module according to claim 103, wherein at least a portion of said focus mechanism is disposed on an outer surface of said cylindrical wall.

105. A camera module according to claim 103, wherein:
said lens unit further includes a sleeve at least partially surrounding said cylindrical wall when said lens unit is positioned with respect to said image capture device; and
said sleeve includes said complementary thread set.

106. A camera module according to claim 101, wherein:
said housing defines a cylindrical bore operative to receive said lens unit; and
the upper perimeter of said bore defines said opening.

107. A camera module according to claim 101, wherein said lens unit includes:
a lens barrel; and
said lens is rigidly mounted within said lens barrel.

108. A camera module according to claim 107, wherein said lens rotates with said lens unit and moves with said lens unit along said axis when said lens unit is rotated about said axis.

109. A camera module comprising:
an image capture device including a flat top surface;
a lens unit including a lens rigidly affixed to said lens unit;
a housing fixed with respect to said image capture device and defining an opening to receive said lens unit, said housing positioning said lens unit with respect to said image capture device; and
a focus mechanism disposed outside of said opening and operative to move said lens unit along an axis substantially perpendicular to said flat top surface of said image capture device when said lens unit is rotated about said axis; and wherein said housing further includes a base surrounding said image capture device and a cylindrical wall defining said opening;

said cylindrical wall includes a top surface defining at least one ramp; and said lens unit includes at least one complementary ramp for slidably engaging said at least one ramp defined by said top surface of said cylindrical wall.

110. A camera module according to claim 109, wherein:
said housing defines a cylindrical bore operative to receive said lens unit; and
the upper perimeter of said bore defines said opening.

111. A camera module according to claim 109, wherein said lens unit includes:
a lens barrel; and
said lens is rigidly mounted within said lens barrel.

112. A camera module according to claim 111, wherein said lens rotates with said lens unit and moves with said lens unit along said axis when said lens unit is rotated about said axis.

113. A lens assembly comprising:
a lens unit including a lens rigidly mounted in a first housing;
a second housing defining a receiving portion for accepting said lens unit; and
a focus mechanism for adjustably coupling said first housing and said second housing, said focus mechanism disposed on the outside of said second housing; and wherein
said second housing includes a cylindrical wall defining said receiving portion; and
at least a portion of said focus mechanism is disposed on a top surface of said cylindrical wall.

114. A lens assembly according to claim 113, wherein said focus mechanism includes:
a ramp disposed on one of said second housing and said lens unit; and
a ramp engaging structure disposed on the other of said second housing and said lens unit.

115. A lens assembly according to claim 113, wherein:
one of said cylindrical wall and said lens unit defines a channel; and
the other of said cylindrical wall and said lens unit defines a guide member engaging said channel, said guide member operative to prevent said lens unit from contacting an inner surface of said cylindrical wall.

116. A lens assembly according to claim 113, wherein said focus mechanism causes said lens and said lens unit to rotate together when said lens unit is adjusted with respect to said housing.

117. A lens assembly comprising:
a lens unit including a lens rigidly mounted in a first housing;
a second housing defining a receiving portion for accepting said lens unit; and
a focus mechanism for adjustably coupling said first housing and said second housing, said focus mechanism disposed on the outside of said second housing; and wherein
said second housing includes a cylindrical wall defining said receiving portion;
one of said cylindrical wall and said lens unit defines a channel; and
the other of said cylindrical wall and said lens unit defines a guide member engaging said channel, said guide member operative to prevent said lens unit from contacting an inner surface of said cylindrical wall.

118. A lens assembly according to claim 117, wherein said focus mechanism includes:
a ramp disposed on one of said second housing and said lens unit; and
a ramp engaging structure disposed on the other of said second housing and said lens unit.

119. A lens assembly according to claim 117, wherein at least a portion of said focus mechanism is disposed on an outer surface of said cylindrical wall.

120. A lens assembly according to claim 117, wherein said focus mechanism causes said lens and said lens unit to rotate together when said lens unit is adjusted with respect to said housing.

121. A lens assembly comprising:
a lens unit including a lens rigidly mounted in a first housing;
a second housing defining a receiving portion for accepting said lens unit; and
a focus mechanism for adjustably coupling said first housing and said second housing, said focus mechanism disposed on the outside of said second housing; and wherein
said second housing includes a cylindrical wall defining said receiving portion; and
said lens unit further includes a sleeve at least partially surrounding said cylindrical wall when said lens unit is positioned with respect to said housing.

122. A lens assembly according to claim 121, wherein said sleeve includes at least a portion of said focus mechanism.

123. A lens assembly according to claim 121, wherein said focus mechanism includes:
a ramp disposed on one of said second housing and said lens unit; and
a ramp engaging structure disposed on the other of said second housing and said lens unit.

124. A lens assembly according to claim 121, wherein at least a portion of said focus mechanism is disposed on an outer surface of said cylindrical wall.

125. A lens assembly according to claim 121, wherein said focus mechanism causes said lens and said lens unit to rotate together when said lens unit is adjusted with respect to said housing.

* * * * *